(12) United States Patent
Lim et al.

(10) Patent No.: US 11,618,828 B2
(45) Date of Patent: Apr. 4, 2023

(54) FLEXIBLE WINDOW STACK STRUCTURE AND DISPLAY DEVICE INCLUDING THE SAME

(71) Applicant: DONGWOO FINE-CHEM CO., LTD., Jeollabuk-do (KR)

(72) Inventors: Geo San Lim, Seoul (KR); Seung Hee Kim, Seoul (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 332 days.

(21) Appl. No.: 16/547,929

(22) Filed: Aug. 22, 2019

(65) Prior Publication Data

US 2019/0377105 A1    Dec. 12, 2019

Related U.S. Application Data

(63) Continuation of application No. PCT/KR2018/001800, filed on Feb. 12, 2018.

(30) Foreign Application Priority Data

Feb. 22, 2017  (KR) .......................... 10-2017-0023506

(51) Int. Cl.
*C09D 4/00* (2006.01)
*G02B 1/14* (2015.01)
(Continued)

(52) U.S. Cl.
CPC ............... *C09D 4/00* (2013.01); *C08J 7/042* (2013.01); *C08J 7/046* (2020.01); *C09D 135/02* (2013.01);
(Continued)

(58) Field of Classification Search
CPC . C09D 4/00; C09D 135/02; G02B 1/14; C08J 7/046; C08J 7/042; C08J 2367/02; C08J 2379/08; C08J 2435/02
See application file for complete search history.

(56) References Cited

U.S. PATENT DOCUMENTS

2010/0300611 A1* 12/2010 Yamamoto ................ B32B 7/12
156/248
2015/0140279 A1* 5/2015 Kang ........................ C08J 7/042
427/508

(Continued)

FOREIGN PATENT DOCUMENTS

| CN | 104487494 A | 4/2015 |
| JP | 2017-036439 A | 2/2017 |

(Continued)

OTHER PUBLICATIONS

Office action dated Dec. 18, 2019 from Korean Patent Office in a counterpart Korean Patent Application No. 10-2017-0023506 (all the cited references are listed in this IDS.) (English translation is submitted herewith.).

(Continued)

*Primary Examiner* — Travis M Figg
(74) *Attorney, Agent, or Firm* — The PL Law Group, PLLC

(57) ABSTRACT

A flexible window stack structure includes a substrate, a first hard coating layer formed on a surface of the substrate and a second hard coating layer formed on an opposite surface of the substrate. The first hard coating layer has a curing contraction greater than that of the second hard coating layer, and the second hard coating layer is disposed at an elongated side when the window stack structure is folded. Cracks may be prevented by a curl property of the first hard coating layer when being bent.

7 Claims, 1 Drawing Sheet

(51) Int. Cl.
*C08J 7/04* (2020.01)
*C09D 135/02* (2006.01)
*C08J 7/046* (2020.01)

(52) U.S. Cl.
CPC ............. *G02B 1/14* (2015.01); *C08J 2367/02* (2013.01); *C08J 2379/08* (2013.01); *C08J 2435/02* (2013.01)

(56) References Cited

U.S. PATENT DOCUMENTS

| | | | | |
|---|---|---|---|---|
| 2016/0075882 | A1* | 3/2016 | Hamakubo | C09D 5/00 359/601 |
| 2016/0090349 | A1* | 3/2016 | Ciceron | C07C 69/54 560/198 |
| 2017/0036242 | A1* | 2/2017 | Lee | C08J 7/046 |
| 2017/0276840 | A1* | 9/2017 | Horio | B32B 27/00 |
| 2018/0196169 | A1* | 7/2018 | Choi | G02F 1/133 |

FOREIGN PATENT DOCUMENTS

| | | |
|---|---|---|
| JP | 2017036439 A | 2/2017 |
| KR | 10-2013-0135156 A | 12/2013 |
| KR | 10-2014-0089623 A | 7/2014 |
| KR | 10-2015-0125107 A | 11/2015 |
| KR | 10-2016-0052380 A | 5/2016 |
| KR | 10-2016-0120840 A | 10/2016 |
| KR | 10-2017-0017734 A | 2/2017 |
| WO | WO 2016/208785 A1 | 12/2016 |
| WO | WO 2017/014198 A1 | 1/2017 |

OTHER PUBLICATIONS

Office action dated Feb. 16, 2021 from Japan Intellectual Property Office in a counterpart Japanese Patent Application No. 2019-545780 (all the cited references are listed in this IDS.) (English translation is also submitted herewith.).

Takao Hiraoka et al. Internal Stress Controll of the UV Cured Inkjet Ink Film, Ricoh Technical Report, Jan. 2014. p. 139-145, No. 39, Ricoh Company Ltd., Japan.

International Search Report for PCT/KR2018/001800 dated Jun. 7, 2018.

Notice of Allowance dated May 17, 2022 from Japan Intellectual Property Office in a counterpart Japanese Patent Application No. 2019-545780 (all the cited references are listed in this IDS.) (English translation is also submitted herewith.).

* cited by examiner

FLEXIBLE WINDOW STACK STRUCTURE AND DISPLAY DEVICE INCLUDING THE SAME

CROSS REFERENCE TO RELATED APPLICATIONS AND CLAIM OF PRIORITY

The present application is a continuation application to International Application No. PCT/KR2018/001800 with an International Filing Date of Feb. 12, 2018, which claims the benefit of Korean Patent Application No. 10-2017-0023506 filed on Feb. 22, 2017 at the Korean Intellectual Property Office, the disclosures of which are incorporated by reference herein in their entirety.

BACKGROUND

1. Field

The present invention relates to a flexible window stack structure and a display device including the same.

2. Description of the Related Art

Recently, a display device capable of providing information with a display image is being actively developed. The display device includes a liquid crystal display (LCD) device, an organic light emitting display (OLED) device, a plasma display panel (PDP) device, a field emission display (FED) device, etc.

In the display device, a window substrate may be disposed over a display panel such as an LCD panel or an OLED panel so that the display panel may be protected from an external environment. The window substrate is formed from a glass substrate. As a flexible display has been developed recently, a transparent plastic material is utilized for fabricating the window substrate.

In the window substrate for the flexible display, a plurality of layers are stacked within a limited thickness for achieving a thin and compact display, and elasticity and mechanical durability are required for implementing folding or bending operations without degrading properties for protecting the display device such as moisture resistance, heat resistance, etc.

For example, prevention of cracks and delamination in the layers of the window substrate when being repeatedly bent or folded is needed.

For example, Korean Published Patent Application No. 2016-0120840 discloses a cover window for a display device, however, fails to suggest desirable properties for the flexible display

SUMMARY

According to an aspect of the present invention, there is provided a flexible window stack structure having improved flexibility and mechanical reliability.

According to an aspect of the present invention, there is provided a display device including a flexible window stack structure that has improved flexibility and mechanical reliability.

The above aspects of the present invention will be achieved by the following features or constructions:

(1) A flexible window stack structure, comprising: a substrate; a first hard coating layer formed on a surface of the substrate; and a second hard coating layer formed on an opposite surface of the substrate, wherein the first hard coating layer has a curing contraction greater than that of the second hard coating layer, and the second hard coating layer is disposed at an elongated side when the window stack structure is folded.

(2) The flexible window stack structure according to the above (1), wherein the window stack structure has a normal curl in a folding direction such that a surface of the first hard coating layer faces each other.

(3) The flexible window stack structure according to the above (2), wherein a degree of the normal curl is in a range from 5 to 50 mm.

(4) The flexible window stack structure according to the above (1), wherein the first hard coating layer and the second hard coating layer are formed of a hard coating composition that includes a photo-curable compound containing an acrylate functional group, a photo-initiator and a solvent.

(5) The flexible window stack structure according to the above (4), wherein the first hard coating layer and the second hard coating layer have the same thickness, and a functionality relative to a molecular weight of the photo-curable compound used in the first hard coating layer is greater than that in the second hard coating layer.

(6) The flexible window stack structure according to the above (4), wherein a thickness of the first hard coating layer is greater than that of the second hard coating layer.

(7) The flexible window stack structure according to the above (1), wherein the first hard coating layer or the second hard coating layer has a multi-layered structure.

(8) The flexible window stack structure according to the above (1), wherein the substrate includes at least one selected from a group consisting of polyimide (PI), polyethersulphone (PES), polyacrylate (PAR), polyetherimide (PEI), polyethyelenen napthalate (PEN), polyethyelene terephthalate (PET), polyphenylene sulfide (PPS), polyallylate, polycarbonate (PC), cellulose triacetate (TAC) and cellulose acetate propionate (CAP).

(9) A display device including the flexible window stack structure according to any one of the above (1) to (8).

(10) The display device according to the above (9), wherein the display device is a flexible display where the flexible window stack structure is bent along a direction in which the first hard coating layer is compressed.

A flexible window stack structure of the present invention includes a first hard coating layer and a second hard coating layer formed on both surfaces of a substrate, and the first hard coating layer that may be folded inwardly (so that a surface may face each other) in a folding may have a curing contraction greater than that of the second hard coating layer that may be outwardly folded. Thus, a bending may be applied inwardly and an elongation of the second hard coating layer that may be an outward film may be reduced so that cracks and delamination of the window stack structure may be suppressed during the folding operation.

In exemplary embodiments, the window stack structure may have a normal curl in a folding direction, and thus may be easily combined with a display device so that mechanical stability may be maintained for a long period during the folding operation.

DETAILED DESCRIPTION

A flexible window stack structure according to exemplary embodiment of the present invention includes a substrate, a first hard coating layer on a surface of the substrate and a second hard coating layer on an opposite surface of the substrate. The first hard coating layer may have a curing contraction greater than that of the second hard coating layer, and the second hard coating layer may be disposed at an elongated side when being folded so that crack resistance may be improved. A display device including the flexible window stack structure is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Flexible Window Stack Structure

A flexible window stack structure (hereinafter, abbreviated as a window structure) according to exemplary embodiments of the present invention may serve as a cover window or a surface protective film of a display device such as a flexible display.

The window stack structure may be exposed to an outside of the display device. However, a functional layer or a functional film may be additionally stacked on the window stack structure such that the window stack structure may not be directly exposed to the outside of the display device, and this case is also within the scope of the window stack structure of the present invention.

Figure 1:
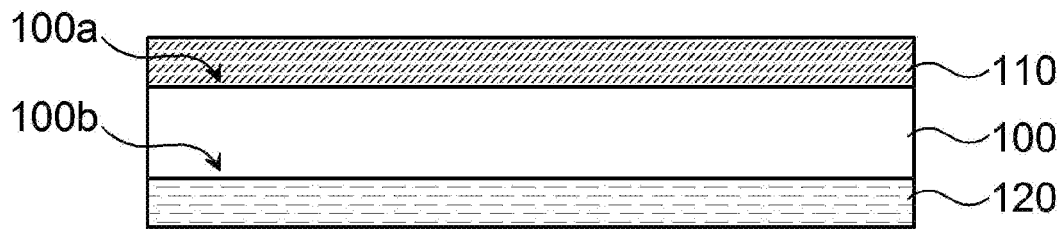
FIG. 1 is a cross-sectional view illustrating a flexible window stack structure in accordance with exemplary embodiments of the present invention.
Figure 2:
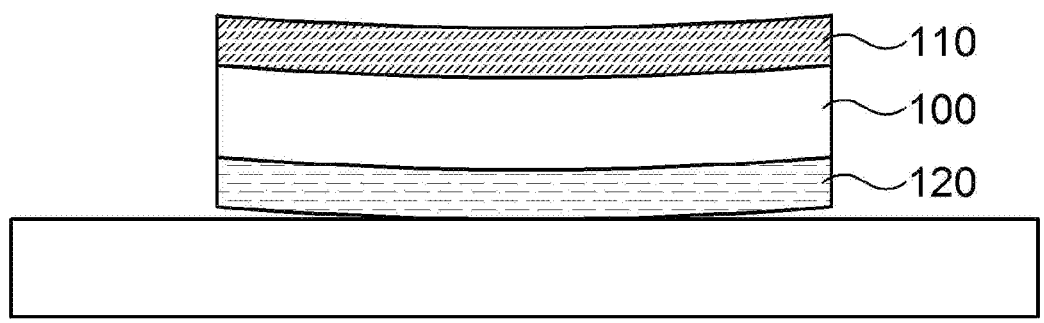
FIG. 2 is a cross-sectional view illustrating a curl direction of a flexible window stack structure in accordance with exemplary embodiments.

FIG. 1 is a cross-sectional view illustrating a flexible window stack structure in accordance with exemplary embodiments of the present invention. FIG. 2 is a cross-sectional view illustrating a curl direction of a flexible window stack structure in accordance with exemplary embodiments.

Referring to FIG. 1, the window stack structure may include a substrate 100, and a first hard coating layer 110 and a second hard coating layer 120 formed on both surfaces of the substrate 100.

The substrate 100 may include a material having durability against an external shock and transparency for providing visibility when being applied to an LCD device, an OLED device, a touch screen panel (TSP), etc. For example, the substrate 100 may serve as a base film of the window stack structure.

The substrate 100 may include a plastic material having a predetermined flexibility. In this case, a display device including the window stack structure may be provided as a flexible display. For example, the substrate 100 may include polyimide (PI), polyethersulphone (PES), polyacrylate (PAR), polyetherimide (PEI), polyethyelenen napthalate (PEN), polyethyelene terephthalate (PET), polyphenylene sulfide (PPS), polyallylate, polycarbonate (PC), cellulose triacetate (TAC), cellulose acetate propionate (CAP), etc. These may be used alone or in a combination thereof.

In an embodiment, the substrate 100 may include PI or PET from an aspect of achieving flexibility and hardness.

As illustrated in FIG. 1, the substrate 100 may include a surface 100*a* and an opposite surface 100*b*. In exemplary embodiments, the surface 100*a* and the opposite surface 100*b* may face each other. For example, the surface 100*a* may be an upper surface of the substrate 100 and the opposite surface 100*b* may be a lower surface of the substrate 100. The first hard coating layer 110 may be disposed on the surface 100*a* of the substrate 100. The second hard coating layer 120 may be disposed on the opposite surface 100*b* of the substrate 100.

When a display device including the window stack structure is an in-folding type device being inwardly folded so that a display screen may contact each other, the opposite surface 100*b* or the second hard coating layer 120 may be disposed toward an opposite side of a viewer side (an inside of the display device). The surface 100*a* or the first hard coating layer 110 may be disposed toward the viewer side of the display device.

Alternatively, when a display device including the window stack structure is an out-folding type device being outwardly folded so that a display screen may protrude to an outside, the opposite surface 100*b* or the second hard coating layer 120 may be disposed toward the viewer side. The surface 100*a* or the first hard coating layer 110 may be disposed toward the opposite side of the viewer side (the inside of the display device).

The first and second hard coating layers 110 and 120 may be formed by coating a hard coating composition on the surface 100*a* and the opposite surface 100*b* and curing the same. The hard coating composition may include a photo-curable compound, a photo-initiator and a solvent.

The photo-curable compound may include a compound capable of being polymerized or cross-linked to form a transparent photo-cured resin, and may include, e.g., a photo-curable (meth)acrylate oligomer or a photo-curable monomer.

The photo-curable (meth)acrylate oligomer may normally include epoxy (meth)acrylate, urethane (meth)acrylate, etc., and urethane (meth)acrylate may be preferable used. Urethane (meth)acrylate may be prepared by reacting a (meth)acrylate having a hydroxyl group in a molecule and a compound having an isocyanate group with a catalyst.

The (meth)acrylate having the hydroxyl group may include, e.g., 2-hydroxyethyl (meth)acrylate, 2-hydroxyisopropyl (meth)acrylate, 4-hydroxybutyl (meth)acrylate, caprolactone ring-opened hydroxyacrylate, a mixture of pentaerythritol tri/tetra (meth)acrylate, dipentaerythritol penta/hexa (meth)acrylate, etc. These may be used alone or in a combination thereof.

The compound having the isocyanate group may include, e.g., 1,4-diisocyanatobutane, 1,6-diisocyanatohexane, 1,8-diisocyanantooctane, 1,12-diisocyanatododecane, 1,5-diisocyanato-2-methylpentane, trimethyl-1,6-diisocyanatohexane, 1,3-bis(isocyanatomethyl)cyclohexane, trans-1,4-cyclohexenediisocyanate, 4,4'-methylenebis(cyclohexylisocyanate), isophorone diisocyanate, toluene-2,4-diisocyanate, toluene-2,6-diisocyanate, xylene-1,4-diisocyanate, tetramethyl xylene-1,3-diisocyanate, 1-chloromethyl-2,4-diisocyanate, 4,4'-methylenebis(2,6-dimethylphenylisocyanate), 4,4'-oxybis(phenylisocyanate), tri-functional isocyanate derived from hexamethylenediisocynate, and trimethanepropanol adduct tolenediisocyanate, etc. These may be used alone or in a combination thereof.

The photo-curable monomer may include, a monomer having an unsaturated group, e.g., a (meth)acryloyl group, a vinyl group, a styryl group, an allyl group as a photo-curable functional group. Preferably, a monomer having the (meth)acryloyl group may be used as the photo-curable monomer.

The monomer having the (meth)acryloyl group may include, e.g., neopentyl glycol acrylate, 1,6-hexanediol (meth)acrylate, propyleneglycol di(meth)acrylate, triethyleneglycol di(meth)acrylate, dipropyleneglycol di(meth)acrylate, polyethyleneglycol di(meth)acrylate, polypropyleneglycol di(meth)acrylate, trimethylolpropane tri(meth)acrylate, trimethylolethane tri(meth)acrylate, 1,2,4-cyclohexane tetra(meth)acrylate, pentaglycerol tri(meth)acrylate, pentaerythritol tetra(meth)acrylate, pentaerythritol tri(meth)acrylate, dipentaerythritol tri(meth)acrylate, dipentaerythritol penta(meth)acrylate, dipentaerythritol tetra(meth)acrylate, dipentaerythritol hexa(meth)acrylate, tripentaerythritol tri(meth)acrylate, tripentaerythritol hexa(meth)acrylate, bis(2-hydroxyethyl)isocyanurate di(meth)acrylate, hydroxyethyl (meth)acrylate, hydroxypropyl (meth)acrylate, hydroxybutyl (meth)acrylate, isooctyl (meth)acrylate, isodecyl (meth)acrylate, stearyl (meth)acrylate, tetrahydrofurfuryl (meth)acrylate, phenoxyethyl (meth)acrylate, isoborneol (meth)acrylate, etc. These may be used alone or in a combination thereof.

The photo-curable compound may include at least one of the photo-curable (meth)acrylate oligomer or the photo-curable monomer.

An amount of the photo-curable compound may not be specifically limited, but may be in a range from about 5 to 80 parts by weight based on 100 parts by weight of the hard coating composition. If the amount of the photo-curable compound is less than about 5 parts by weight, a sufficient hardness may not be achieved. If the amount of the photo-curable compound exceeds about 80 parts by weight, a curl of the window stack structure may be excessively increased.

The photo-initiator may include any compound capable of generating ions, Lewis acids or radicals by irradiation of an active energy ray such as visible light, ultraviolet, X-ray or electron ray to initiate a polymerization of the photo-curable compound. Examples of the photo-initiator may include an onium salt such as an aromatic diazonium salt, an aromatic iodonium salt or an aromatic sulfonium salt, an acetophenone-based compound, a benzoin-based compound, a benzophenone-based compound, a thioxanthone-based compound, etc.

An amount of the photo-initiator may be in a range from about 0.1 to 10 parts by weight based on 100 parts by weight of the hard coating composition. If the amount of the photo-initiator is less than about 0.1 part by weight, a curing rate may be excessively decreased. If the amount of the photo-initiator exceeds about 10 parts by weight, cracks may be caused in the hard coating layer due to an over-curing.

A solvent for an organic-based coating layer composition may be used as the solvent without a specific limitation. For example, the solvent may include an alcohol-based solvent (methanol, ethanol, isopropanol, butanol, methyl cellosolve, ethyl cellosolve, etc.), a ketone-based solvent (methyl ethyl ketone, methyl butyl ketone, methyl isobutyl ketone, diethyl ketone, dipropyl ketone, cyclohexanone, etc.), a hexane-based solvent (hexane, heptane, octane, etc.), a benzene-based solvent (benzene, toluene, xylene, etc.), or the like. These may be used alone or in a combination thereof.

An amount of the solvent may not be specifically limited, but may be in a range from about 10 to 95 parts by weight based on 100 parts by weight of the hard coating composition. If the amount of the solvent is less than about 10 parts by weight, coating and working properties may be degraded. If the amount of the solvent exceeds about 95 parts by weight, a curing period may be excessively increased, and curl and hardness may not be easily controlled.

In some embodiments, a leveling agent, an inorganic particle, a UV absorber, etc., may be further included in the hard coating composition so that mechanical and optical properties of the hard coating layer may be enhanced.

According to exemplary embodiments of the present invention, a curing contraction of the first hard coating layer 110 may be greater than that of the second hard coating layer 120. The term "curing contraction" used herein may be defined as a difference between an area or a volume measured when the hard coating composition is coated and dried, and an area or a volume measured after a light irradiation.

In some embodiments, the curing contraction may be controlled by adjusting a type and an amount of the photo-curable compound or an amount of the photo-initiator in the hard coating composition. For example, in the hard coating composition for forming the first hard coating layer 110, the photo-curable compound having a relatively greater functionality (e.g., an acrylate functionality) relative to a molecular weight may be used, or the amount of the photo-curable compound and/or the photo-initiator may be increased.

In an embodiment, the photo-curable compound used for forming the second hard coating layer 120 may include a dendrimer (e.g., a dendritic acrylate). A cross-linking density or a curing density may be reduced by a steric hindrance effect due to a bulky structure of the dendrimer so that a curing contraction ratio or a curing contraction amount of the second hard coating layer 120 may be decreased.

In some embodiments, when the first hard coating 110 and the second hard coating layer 120 may be formed from the same hard coating composition and the same light-irradiation amount, a thickness of the first hard coating layer 110 may be greater than that of the second hard coating layer 120. Thus, an absolute amount of the curing contraction of the first hard coating layer 110 may be increased.

In some embodiments, when the first hard coating layer 110 and the second hard coating layer 120 may be formed from the same hard coating composition to have the same thickness, the first hard coating layer 110 may be formed using greater light-irradiation amount than that for the second hard coating layer 120.

In some embodiments, when the first hard coating layer 110 and the second hard coating layer 120 have the same thickness, the first hard coating layer 110 may be formed using the photo-curable compound having the functionality relative to the molecular weight greater than that in the second hard coating layer 120.

As the curing contraction of the first hard coating layer 110 that may be disposed inwardly in the window stack structure to face each other when being bent or folded is relatively greater, a curl may be generated toward the first hard coating layer 110. Accordingly, in the window stack structure, the hard coating layers 110 and 120 may be arranged so that the curl may be generated in a folding direction when being applied to a display device.

In the present application, the curl to the folding direction of the window stack structure or the display device is indicted as a "normal curl" and the curl to an opposite direction relative to the folding direction is indicated as a "reverse curl."

In exemplary embodiments, the window stack structure may have the normal curl by the first hard coating layer 110. Accordingly, when the folding or bending is applied from the second hard coating layer 120 or from an outside of the window stack structure, an elongation may be reduced and cracks may be suppressed or reduced during the folding or bending.

In a comparative example, in a double sided hard coating layer, the hard coating layer is normally strong to a compression, but weak to an elongation. Thus, cracks may be easily caused at an outward hard coating layer when being bent.

However, according to exemplary embodiments of the present invention, the normal curl may be generated by the first hard coating layer 100 so that the elongation of the outward hard coating layer (the second hard coating layer) of the window stack structure may be reduced. Thus, improved flexible and bending properties may be obtained while preventing cracks.

Referring to FIG. 2, the window stack structure according to exemplary embodiments of the present invention may have the normal curl as described above. In some embodiments, the normal curl may be in a range from about 5 to 50 mm. For example, a sample of the window stack structure having a length and a width of each 10 cm may be positioned on a planar surface, and an average of heights spaced from the planar surface of four corners of the sample after a predetermined time may be measured as a degree of the normal curl.

If the degree of the normal curl is less than about 5 mm, cracks may not be sufficiently prevented. If the degree of the normal curl exceeds about 50 mm, stress may be constantly generated when combined with the display device to cause an interlayer delamination.

Figure 3:
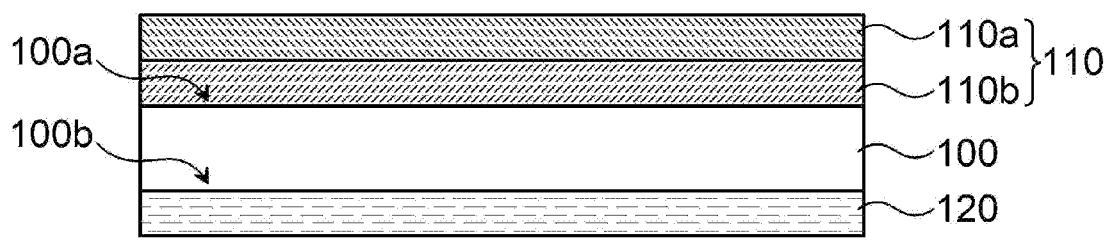
FIGS. 3 and 4 are cross-sectional views illustrating flexible window stack structures in accordance with some exemplary embodiments.
Figure 4:
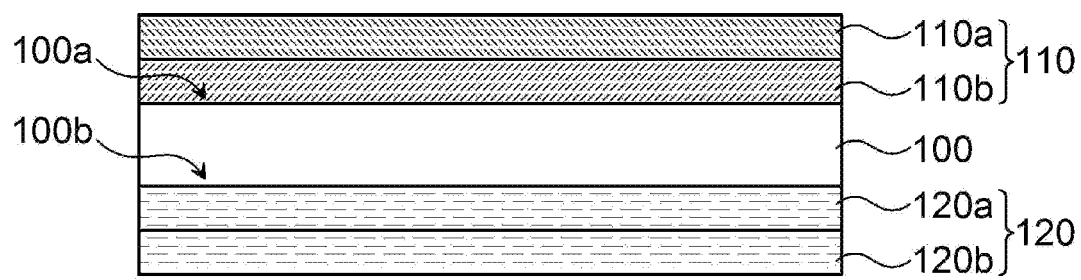

FIGS. 3 and 4 are cross-sectional views illustrating flexible window stack structures in accordance with some exemplary embodiments. As illustrated in FIGS. 3 and 4, the hard coating layer may have a multi-layered structure.

Referring to FIG. 3, the first hard coating layer 110 may have the multi-layered structure. For example, the first hard coating layer 110 may include a first layer 110a and a second layer 110b sequentially stacked from the surface 100a of the substrate 100.

The first hard coating layer 100 may have the multi-layered structure so that the normal curl may be easily induced in the window stack structure.

Referring to FIG. 4, the second hard coating layer 120 may be also formed as a multi-layered structure. For example, the second hard coating layer 120 may also include a first layer 120a and a second layer 120b sequentially formed from the opposite surface 100b of the substrate 100.

The second hard coating layer 120 may include the multi-layered structure without an offset on the normal curl from the window stack structure so that durability such as a pencil hardness at an outward surface of the window stack structure may be improved.

Display Device

According to embodiments of the present invention, a display device including the window stack structure as described above is also provided.

For example, the window stack structure may be combined with a display panel included in an OLED device, a LCD device, etc. The display panel may include a pixel circuit including a thin film transistor (TFT) arranged on a substrate and a pixel unit or a light emitting unit electrically connected to the pixel circuit.

The display panel may include a base substrate including a flexible resin such as polyimide, and may be combined with the window stack structure so that a flexible display device may be achieved. As described above, the substrate 100 of the window stack structure may also include a material having improved flexibility such as polyimide.

As described above, the second hard coating layer may be disposed at an opposite side of a folding direction or an elongated side when the display device is folded. A curl may be provided by the hard coating layer formed at a side of a folding direction or a compressive side when the display device is folded so that mechanical durability and reliability of the flexible display device may be maintained even when a stress by the folding or bending is applied.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

EXAMPLES AND COMPARATIVE EXAMPLES

Preparation of Hard Coating Composition

Preparation Example 1

25 parts by weight of pentaerythritol triacrylate, 50 parts by weight of nano silica sol (particle diameter: 20 nm, solid content: 48%, solvent: MEK), 15 parts by weight of methyl ethyl ketone, 7 parts by weight of propylene glycol monomethyl ether, 2.5 parts by weight of 1-hydroxy cyclohexyl phenyl ketone as a photo-initiator, and 0.5 part by weight of a leveling agent (BYK 3570, BYK Chem) were mixed and filtered through a polypropylene filter to obtain a hard coating composition.

Preparation Example 2

25 parts by weight of 18-functional acrylate (SP1106, Miwon Commercial), 50 parts by weight of nano silica sol (particle diameter: 20 nm, solid content: 48%, solvent: MEK), 15 parts by weight of methyl ethyl ketone, 7 parts by weight of propylene glycol monomethyl ether, 2.5 parts by weight of 1-hydroxy cyclohexyl phenyl ketone as a photo-initiator, and 0.5 part by weight of a leveling agent (BYK 3570, BYK Chem) were mixed and filtered through a polypropylene filter to obtain a hard coating composition.

The hard coating composition of Preparation Example 1 or 2 was coated on a surface of the substrate, and the solvent was dried at 80° C. for 2 minutes. Window stack structures as shown in Table 1 below were fabricated by irradiating UV on the dried film with a total light amount of 400mJ/cm$^2$ to form a first hard coating layer or a second hard coating layer. A composition, a material and a thickness of each layer were shown in Table 1.

As described with reference to FIGS. 1 to 4, the first hard coating layer was disposed at a compressive side when being folded, and the second hard coating layer was defined as a coating layer disposed at an elongated side when being folded.

TABLE 1

| | Example 1 | Example 2 | Example 3 | Example 4 | Example 5 | Comparative Example 1 | Comparative Example 2 |
|---|---|---|---|---|---|---|---|
| First Hard Coating Layer | Preparation Example 1/12 μm | Preparation Example 1/12 μm | Preparation Example 1/12 μm | Preparation Example 1/6 μm Preparation Example 2/6 μm | Preparation Example 1/8 μm Preparation Example 2/4 μm | Preparation Example 1/12 μm | Preparation Example 1/9 μm |
| Substrate | PI/50 μm | PET/50 μm | PI/50 μm | PI/50 μm | PI/50 μm | PI/50 μm | PI/50 μm |
| Second Hard Coating Layer | Preparation Example 1/9 μm | Preparation Example 1/9 μm | Preparation Example 2/12 μm | Preparation Example 2/12 μm | Preparation Example 2/8 μm Preparation Example 1/4 μm | Preparation Example 1/12 μm | Preparation Example 1/12 μm |

Experimental Example

1) Evaluation of Curl

The coated film was cut by a dimension of a width 10 cm*a length 10 cm, and left in an atmosphere of a temperature of 25° C. and a relative humidity of 50% for 24 hours, and distances of 4 corners of the film spaced apart from a bottom while a lower surface of the second hard coating layer (an outward surface when being folded) was put on the bottom were measured. A curl type was evaluated as follows.

Normal Curl: 4 corners were upward from the bottom.

Reverse Curl: 4 corners were toward the bottom, and a central portion of the film was upward from the bottom.

2) Measuring Pencil Hardness

The window stack structure was fixed on a glass such that the surface of the first hard coating layer was upwardly disposed, and the pencil hardness was measured under a load of 1 kg. After 5 tests, a hardness obtained from at least 4 tests was determined as a pencil hardness of the coating film.

3) Evaluation Bending Property

The window stack structure was folded and released repeatedly 200,000 times such that the surface of the first hard coating layer faced each other with a distance of 5 mm, and fractures of the film was evaluated as follows.

OK: Fractures or cracks of the stack structure were not observed after repeating 200,000 times bending.

NG: Fractures or cracks of the stack structure were observed after repeating 200,000 times bending.

The results are shown in Table 2 below.

TABLE 2

| | Example 1 | Example 2 | Example 3 | Example 4 | Example 5 | Comparative Example 1 | Comparative Example 2 |
|---|---|---|---|---|---|---|---|
| Curl | Normal Curl | Normal Curl | Normal Curl | Normal Curl | Normal Curl | No Curl | Reverse Curl |
| Pencil Hardness | 7H | 7H | 8H | 7H | 9H | 8H | 7H |
| Bending Property | OK | OK | OK | OK | OK | NG | NG |

Referring to Table 2, in the stack structure of Examples having the normal curl, cracks or fractures were not caused in the bending test. However, in the stack structures of Comparative Examples having not curl or having the reverse curl, cracks and fractures occurred.

Additionally, in the stack structure of Example 5 having the multi-layered first and second hard coating layers and maintaining the normal curl, hardness was improved relatively to those of other Examples.

What is claimed is:

1. A flexible window stack structure, comprising:
    a substrate;
    a first hard coating layer formed on a surface of the substrate, the first hard coating layer comprising an acrylate compound different from a dendritic acrylate compound; and
    a second hard coating layer formed on an opposite surface of the substrate, the second hard coating layer comprising the dendritic acrylate compound,
    wherein the first hard coating layer has a curing contraction greater than that of the second hard coating layer, and the second hard coating layer is disposed at an opposite side of a folding direction or an elongated side when the flexible window stack structure is folded; and
    the flexible window stack structure has a normal curl in the folding direction such that a surface of the first hard coating layer faces each other, and a degree of the normal curl is in a range from 5 to 50 mm in a state including only the substrate, the first hard coating layer and the second hard coating layer,
    wherein the degree of normal curl is evaluated as an average of heights of four corners of a lower surface of the second hard coating layer spaced apart from a level where the lowermost surface of the second hard coating layer is positioned.

2. The flexible window stack structure according to claim 1, wherein each of the first hard coating layer and the second hard coating layer is formed of a hard coating composition that includes a photo-curable compound containing an acrylate functional group, a photo-initiator and a solvent; and the acrylate functional group of the photo-curable compound of the second hard coating layer is a dendritic acrylate functional group, and the acrylate function group of the photo-curable compound of the first hard coating layer is an acrylate functional group other than the dendritic acrylate functional group.

3. The flexible window stack structure according to claim 2, wherein a thickness of the first hard coating layer is greater than that of the second hard coating layer.

4. The flexible window stack structure according to claim 1, wherein the first hard coating layer or the second hard coating layer has a multi-layered structure.

5. The flexible window stack structure according to claim 1, wherein the substrate includes at least one selected from a group consisting of polyimide (PI), polyethersulphone (PES), polyacrylate (PAR), polyetherimide (PEI), polyethylene naphthalate (PEN), polyethylene terephthalate (PET), polyphenylene sulfide (PPS), polyallylate, polycarbonate (PC), cellulose triacetate (TAC) and cellulose acetate propionate (CAP).

6. A display device including the flexible window stack structure according to claim 1.

7. The display device according to claim 6, wherein the image display device is a flexible display where the flexible window stack structure is bent along a direction in which the first hard coating layer is compressed.

* * * * *